United States Patent Office 3,048,552
Patented Aug. 7, 1962

3,048,552
COATING COMPOSITION COMPRISING AN EPOXY RESIN, AN ACRYLATE TRIPOLYMER AND A LATENT CURING CATALYST, AND METHOD OF PREPARATION
James Chen-Shang Fang, Springfield, Pa., assignor to E. I. du Pont de Nemours and Company, Wilmington, Del., a corporation of Delaware
No Drawing. Filed Dec. 3, 1959, Ser. No. 856,939
19 Claims. (Cl. 260—28.5)

This invention relates to coating compositions of the baking type which are catalytically cured. More particularly the invention relates to stable liquid coating compositions comprising a carboxyl-containing addition copolymer, a resinous epoxy condensate having an average of more than one 1,2-epoxy group per molecule, a liquid volatile organic solvent, and, as a latent curing agent for these reactive film-forming materials, a water-insoluble quaternary ammonium salt having an anion containing a plurality of atoms.

A wide variety of compounds, including some quaternary ammonium salts are known to be useful as curing catalysts for epoxy resins per se or mixtures of epoxy resins with a carboxyl-containing addition polymer. Such catalysts used in small effective proportions sufficient to catalyze the cure at ordinary baking temperatures which may be as high at 450° F. usually are also sufficiently active at room temperature to cause reactivity or slow cure at room temperature and thus create instability in the package during storage. To avoid premature reactivity in the package, it is general practice to provide the uncatalyzed composition in one package and the curing catalyst in a second package to be appropriately combined with the first package shortly before use of the catalyzed composition. When a product is supplied in the form of a plurality of package units to be combined by the user, there is risk of non-uniformity of the final combination, risk of improper proportions unless a full package of the catalyst is combined with a full package of the uncatalyzed composition, and risk of having a surplus of catalyzed composition which cures significantly in the package before it is consumed. In many instances the cure rapidly advances to a degree requiring discard of the catalyzed composition.

The present invention concerns the discovery of a particular class of useful quaternary ammonium salts for curing compositions having as the essential organic film-forming material thereof a mixture of a soluble carboxyl-containing addition copolymer and a soluble resinous epoxy condensate, these curing catalysts being of the latent type which are substantially inactive at ordinary storage temperatures and adequately effective at ordinary baking temperatures for these coating compositions. These effective latent curing catalysts which can be combined with the uncatalyzed coating composition as a stable single package are substantially water-insoluble quaternary ammonium salts having the general formula

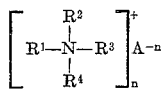

whereof A<sup>−n</sup> is an inorganic anion having a valence of −n with n being an integer having a value in the range of 1 to 4. This inorganic anion is composed of a plurality of at least 5 atoms having at least one atom of a chemical element in an electropositive state covalently joined to a plurality of at least four atoms of at least one chemical element in electronegative state sufficient to provide the anion with an electronegative valence of from −1 to −4. Oxy-acid anions and fluoro-acid anions are preferred anions having a plurality of oxygen atoms and fluorine atoms respectively as the chemical elements present in the electronegative state. The quaternary ammonium cation is characterized by the following general formula

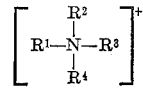

where R<sup>1</sup>—, R<sup>2</sup>—, R<sup>3</sup>—, and R<sup>4</sup>— are monovalent hydrocarbon radicals including from two to four $C_1$–$C_4$ alkyl radicals, the remaining hydrocarbon radicals containing up to 20 carbon atoms each and preferably being $C_8$–$C_{20}$ acyclic. Thus the four hydrocarbon radicals joined to the ammonium nitrogen atom can total as many as 48 carbon atoms, preferably no more than 32 carbon atoms, and as few as 4 carbon atoms. $CH_3$— is preferred as the $C_1$–$C_4$ alkyl radical. The higher acyclic hydrocarbon radicals having up to 20 carbon atoms ordinarily are represented by composite mixtures of $C_8$ to $C_{20}$ acyclic radicals the composition of which includes a major proportion of radicals in the $C_{12}$–$C_{18}$ range. The following hydrocarbon radicals are representative species which are useful in combination with the plurality of $CH_3$— radicals in preferred quaternary ammonium cations: ethyl, propyl, butyl, isobutyl, pentyl, hexyl, 2-ethylbutyl, heptyl, octyl, 2-ethylhexyl, nonyl, decyl, dodecyl, tetradecyl, hexadecyl, octadecyl, octadecenyl, octadecadienyl, benzyl, phenyl and cyclohexyl.

The term substantially water-insoluble quaternary ammonium salt as used throughout the specification and claims characterizes those salts having a solubility no greater than 3 parts by weight per 100 parts of water at 25° C. Solubility of this order of magnitude permits the quaternary ammonium salts to be prepared by precipitation in an exchange reaction in water between a soluble compound having the pertinent anion and a soluble compound having the pertinent quaternary ammonium cation.

The following examples are typical preferred quaternary ammonium salt latent curing agents. These substantially water-insoluble quaternary ammonium salts are generally prepared by an exchange reaction process by dissolving a compound which supplies the pertinent anion in water, the compound being either an acid having the pertinent anion or a water-soluble salt of such an acid, and combining and mixing the resulting aqueous solution with an amount of aqueous solution of a compound which supplies an approximately equivalent proportion of the pertinent cation. The cation-supplying compound can be used in the hydroxide form or in the form of a water-soluble salt thereof. It will be recognized that in selecting water-soluble salt compounds for the exchange reaction it is necessary to select salts which on the double exchange precipitates only the quaternary ammonium salt containing both the pertinent cation and pertinent anion and retains the other product of the exchange reaction in aqueous solution. When the compound supplying the pertinent anion is in acid form or soluble-salt form which is acidic in solution, it is ordinarily preferred to include ammonium hydroxide in the aqueous solution of the pertinent anion compound in an amount sufficient to register alkalinity in reference to litmus paper. While an elevated temperature up to the boiling temperature of water can be used to prepare the separate aqueous solutions of the respective reactants, the respective aqueous solutions ordinarily are combined and mixed at a temperature ordinarily no greater than 150° F., preferably at about room temperature. The precipitated quaternary ammonium salt is separated from the reaction mixture by filtration and is washed at least twice with water to remove water-soluble impurities, ordinarily followed by a wash with a water-soluble alkanol, such as anhydrous methanol or isopropanol to facilitate drying. The salt is dried by volatile loss of the alkanol, but satisfactory drying can be accomplished by volatile loss of water from the water-washed salt.

QUATERNARY AMMONIUM PERCHLORATE CATALYST A

Solution I: Parts by wt.
- Perchloric acid—20% _____ 100.6
- Water _____ 400.0

Solution II:
- "Arquad" 12, 33% active quaternary ammonium chloride _____ 52.0
- Water _____ 400.0

Solution I is neutralized with ammonium hydroxide until alkaline to litmus paper and then Solution II is added thereto with vigorous mechanical stirring. The quaternary ammonium salt reaction product is formed as a white precipitate which is separated by filtration, washed twice with water and once with anhydrous methanol. The salt is dried by volatilization of the methanol.

"Arquad" is the registered trademark of Armour and Co. for cationic quarternary ammonium salts of the alkyltrimethylammonium chloride and dialkyldimethylammonium chloride types wherein these alkyl substituents are composed of aliphatic chains having from 8 to 20 carbon atoms. These salts are supplied at 33%–75% active concentration in aqueous isopropanol with a sodium chloride content generally in the range of 0.5% to 1% and in some instances as high as 16% as in "Arquad" 12–33. The average composition of the hydrocarbon radicals in "Arquad" 12 is about 90% dodecyl, 9% tetradecyl and 1% octadecenyl. In consideration of the preponderance of the $C_{12}$ dodecyl component, the mixture of radicals is usually referred to as lauryl. While this perchlorate salt is water-insoluble, it can be dissolved in certain solvents such as diacetone alcohol or a $C_1$–$C_4$ alkyl monoether of ethylene glycol at practical concentrations such as 10% for safer handling.

QUATERNARY AMMONIUM PERCHLORATE CATALYST B

Catalyst B is prepared in the same manner as Catalyst A except that an equivalent weight of "Arquad" C replaces the "Arquad" 12. The average composition of the hydrocarbon radicals in "Arquad" C is about 8% octyl, 9% decyl, 47% dodecyl, 18% tetradecyl, 8% hexadecyl, 5% octadecyl and 5% octadecenyl. This quaternary monoalkyltrimethylammonium chloride is supplied at 50% active concentration in aqueous isopropanol.

TETRAMETHYLAMMONIUM PERCHLORATE CATALYST C

The preparation of this catalyst is the same as for Catalyst A except for substituting an equivalent amount of tetramethylammonium chloride for the "Arquad" 12. The solubility of the resulting water-insoluble tetramethyl ammonium perchlorate salt in water at room temperature is recorded in literature as being 0.0652 mol per liter of water.

QUATERNARY AMMONIUM HEXAFLUOROPHOSPHATE CATALYST D

Solution I: Parts by wt.
- Ammonium hydroxide 28% $NH_3$ _____ 125
- Water _____ 2000

Solution II:
- Aqueous hexafluorophosphoric acid—65% __ 111

Solution III:
- "Arquad" 12—33% active quaternary ammonium chloride _____ 104
- Water _____ 500

Solution II is added to Solution I and mixed. Then Solution III is added thereto with mechanical stirring, mixing being continued for at least 10 minutes. The quaternary ammonium hexafluorophosphate reaction product precipitates from the mixture and is washed and recovered as a dry powder.

TETRAETHYLAMMONIUM HEXAFLUOROPHOSPHATE CATALYST E

The preparation of this catalyst is the same as for Catalyst D except for substituting an equivalent amount of tetraethylammonium chloride for the "Arquad" 12. The solubility of the resulting water-insoluble tetraethylammonium hexafluorophosphate in water at room temperature is recorded in literature as being 0.0294 mol per liter of water.

QUATERNARY AMMONIUM FLUOROBORATE CATALYST F 115.0 grams (1.10 moles) of $NH_4BF_4$ are dissolved in 2000 ml. of distilled water. To this solution is added an aqueous solution of 696 grams of "Arquad" 18–50, 50% aqueous isopropanol solution of octadecyltrimethylammonium chloride (1.00 mol), combined with 2000 ml. of distilled water. The average composition of the hydrocarbon radicals in "Arquad" 18 is 93% octadecyl, 6% hexadecyl and 1% octadecenyl. The combined aqueous solutions are mixed for one hour, the quaternary ammonium fluoroborate is precipitated. The precipitate is separated by filtration, washed twice with water followed by one wash with cold anhydrous isopropanol and dried by volatile loss of the isopropanol. The salt is purified as follows: 25 grams of the salt are dissolved in 1000 ml. of anhydrous isopropanol at 50° C. and this solution is poured into 5000 ml. of cold distilled water. The resulting precipitated salt is separated by filtration, washed three times with cold distilled water and dried in a vacuum desiccator.

QUATERNARY AMMONIUM MOLYBDATE CATALYST G

Solution I: Parts by wt.
- Ammonium molybdate _____ 21
- Water _____ 500

Solution II:
- Benzyltrimethyl ammonium chloride _____ 31
- Water _____ 200

Solution II is added to Solution I with stirring and benzyltrimethylammonium molybdate is formed as a precipitate which is recovered by filtration, washed and dried.

QUATERNARY AMMONIUM TUNGSTATE CATALYST H

Preparation is the same as that of Catalyst G except that potassium orthotungstate, $K_2WO_4.2H_2O$, is equivalently substituted for the ammonium molybdate, $$(NH_4)_2MoO_4$$

DIALKYLDIMETHYLAMMONIUM CATALYSTS

|  | J | K | L |
|---|---|---|---|
| Solution I: |  |  |  |
| Distilled water, ml. | 400 | 400 | 400 |
| $Na_2SO_4$, grams | 28.4 |  |  |
| $(NH_4)_3PO_4$, grams |  | 23.0 |  |
| $NaClO_4$, grams |  |  | 28.0 |
| Solution II—"Arquad" 2HT Solution, grams | 40 | 40 | 40 |

The "Arquad" 2HT solution is prepared by diluting 100 grams of "Arquad" 2HT as supplied at 75% salt concentration in isopropanol with 400 ml. of anhydrous isopropanol. "Arquad" 2HT is reported by Armour Chemical Division, the supplier, as being dialkyldimethylammonium chloride, the dialkyl substituents having an average composition of 24% hexadecyl, 75% octadecyl and 1% octadecenyl.

Clear Solution II is added dropwise to clear Solution I with continuous mixing. The respective quaternary ammonium sulfate, phosphate and perchlorate salts are precipitated. These precipitates are separated by filtration, washed with water and dried.

The foregoing examples of quaternary ammonium salt curing agents are typical preferred species representative of many useful substantially water-insoluble species having an anion of substantially large ionic size in addition to the large quaternary ammonium cation. The following are representative operative anions which can be used to prepare substantially water-insoluble quaternary ammonium salts having the cation as hereinbefore defined.

Oxy-acid anions: $ClO_4^-$, $BrO_4^-$, $MoO_4^=$, $WO_4^=$, $TiO_4^{\equiv}$, $ZrO_4^{\equiv}$, $SiO_4^{\equiv}$, $MnO_4^-$, $CrO_4^=$, $Cr_2O_7^=$, $SO_4^=$, $PO_4^{\equiv}$ Hetero-oxy-acid anions: $PMo_{12}O_{40}^{\equiv}$, $PW_{12}O_{40}^{\equiv}$, $PO_3F^=$, $PO_2F_2^-$ and $SO_3F^-$ Fluoro-acid anions: $BF_4^-$, $PF_6^-$, $SiF_6^=$, $TiF_6^=$, $ZiF_6^=$, $HfF_6^=$, $GeF_6^=$, $SnF_6^=$, $PbF_6^=$, $AsF_6^-$, and $SbF_6^-$ These useful anions are composed of a plurality of at least five atoms and generally include a plurality of four or more oxygen or fluorine atoms chemically joined to a different chemical element. With the $SO_4^=$ and $PO_4^{\equiv}$ anions, the choice of cation is more limited in providing a substantially water-insoluble quaternary ammonium sulfate or phosphate salt. The tetramethyl ammonium salts having these anions are highly water-soluble. The solubility of the higher alkyl trimethylammonium sulfate and phosphate salts ordinarily exceeds the maximum of 3 parts per 100 parts of water which characterizes useful species of the quaternary salt. However, this solubility limitation is readily met when the quaternary ammonium cation in combination with the sulfate or phosphate anion contains two $C_8$-$C_{20}$ hydrocarbon radicals joined to the ammonium nitrogen atom, the remaining hydrocarbon radicals joined thereto being $C_1$-$C_4$ alkyl radicals.

Ordinarily effective proportions of the quaternary ammonium salt catalyst will fall in the range of 0.1 to 2 parts per 100 parts by weight of the organic film-forming components of the composition, proportions in excess of 2 parts being required only with relatively higher than average molecular weight of the quaternary salt. With exceptionally high molecular weight species of the salt, such as those having a heterophosphomolybdate anion or hetero-phosphotungstate anion, the effective useful proportion can be as high as 5 parts. With low molecular weight species, such as the tetra-$C_1$-$C_4$ alkylammonium salts having the defined anion, the practical minimum proportion for effective curing can be as low as 0.05 part on the indicated basis.

The compositions for which the above identified quaternary ammonium salts effectively function as latent curing agents comprise, as essential film-forming materials, a carboxyl-containing addition copolymer of ethylenically unsaturated monomers and a resinous epoxy condensate having an average of more than one, preferably up to about two, 1,2-oxirane oxygen atoms per molecule, these essential film-forming materials being compatible and in solution in a volatile liquid organic solvent.

The composition of the carboxyl-containing addition copolymer can be varied appropriately to meet the requirements pertinent to the ultimate end use. It is desirable for the copolymer to include an appropriate plurality of carboxyl sites therein to provide the desired degree of crosslinking without having excessive carboxyl equivalents unreacted with the epoxy condensate in the crosslinked product. Variation in the content of carboxyl substituent in the copolymer is attained by copolymerizing appropriate proportions of a carboxyl-supplying monomer with one or more monomers which are free of active carboxyl substituents.

The carboxyl-supplying monomer can be widely selected. Copolymerizable monocarboxylic acids, dicarboxylic acids and acids having an even greater plurality of carboxyl substituents per molecule can be used. Preferably the carboxylic monomer is alpha ethylenically unsaturated. Monocarboxylic acids having ethylenic unsaturation in the form of an alpha methylene group, such as acrylic acid and methacrylic acid, are particularly preferred. Partial esters of alpha ethylenically unsaturated alpha, beta dicarboxylic acids, such as the half esters of maleic acid or fumaric acid particularly with a $C_1$-$C_{12}$ alkanol, are also preferred. Acidic partial vinyl esters of dicarboxylic acids which are free of polymerizable unsaturation in the acid portion can be used to provide polymers in which the carboxyl substituent is a component of an extra-linear group rather than being attached directly to a carbon atom in the linear chain of the copolymer. Practical copolymers ordinarily will have an acid number no greater than 150. Copolymers having an acid number of this magnitude can have carboxyl substituents present in the proportion of up to an average of 10 carboxyls per 100 carbon atoms in the linear chain of the copolymer. Preferred copolymers have an acid number in the range of 20–100, although useful copolymers can have an acid number as low as 10.

Like the carboxyl-supplying monomer component, the carboxyl-free monomer components copolymerized therewith can be widely selected. Since these latter monomers ordinarily contribute a major proportion of the copolymer, the choice of these comonomers is dictated mainly by the characteristics desired in the copolymer product. Styrene, methylstyrene, vinyltoluene and butadiene-1,3 are typical hydrocarbon monomers which in polymerized form are found in many commercially useful copolymers having reactive carboxyl substituents. Simple copolymers of a carboxyl-supplying monomer and a copolymerizable ethylenically unsaturated hydrocarbon monomer ordinarily do not provide the balance of properties desired in the copolymer for many coating uses relating to metal protection. For purposes of obtaining the optimum balance of properties in the copolymer to conform with the needs associated with such end uses, it is usually necessary to replace the hydrocarbon monomer component at least in part with one or more ester monomer components, i.e. the copolymerizable monomer mixture is at least ternary in composition. For example, one or more $C_1$-$C_{12}$ alkanol, preferably $C_1$-$C_4$ alkanol, esters of acrylic acid are particularly useful as plasticizing monomer components in combination with styrene, such acrylates on homopolymerization yielding relatively soft polymers. Further variation can be accomplished by including alkanol esters of methacrylic acid in the monomer mixture, particularly $C_1$-$C_4$ alkanol esters of methacrylic acid which on homopolymerization yield relatively hard polymers. The monomer mixture can be still more complex by including effective proportions of other classes of copolymerizable monomers which provide a functional advantage in the copolymer. Acrylonitrile is typical of such supplemental monomers which provide a functional advantage.

The addition copolymers can be prepared by any of the well known techniques of polymerizing monomers or comonomers. They can be prepared by bulk, solution, or emulsion polymerization. The degree of polymerization is not critical, but for coating purposes it is desirable that degree of polymerization be sufficient to yield a copolymer which is a non-tacky solid at room temperature. Polymerization is not advanced to a degree where polymer ceases to be soluble at practical concentrations in practical volatile liquid organic solvents. About 5% of carboxyl-containing copolymer in solution applicable by ordinary coating techniques represents a practical minimum concentration for coating formulations.

A wide variety of vic-epoxy condensates having an average of more than

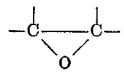

1,2-oxirane moieties per molecule can be used in combination with the carboxyl-containing copolymer. Particularly useful condensates of this class are obtained by reaction of dihydric or polyhydric-phenols or polynuclear phenols with epichlorohydrin in an alkaline solution. Typical commercial epoxy condensates of this class are obtained by the reaction of epichlorohydrin with the bisphenol resulting from acidic condensation of 2 mols of phenol with one mol of acetone, this bis-phenol also being referred to as diphenylolpropane. The resulting epoxy condensate is characterized by the general formula:

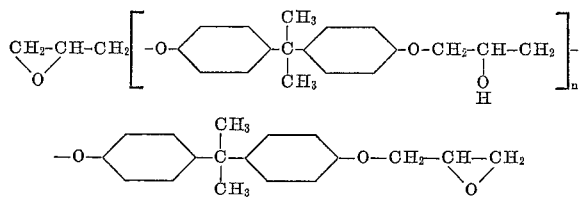

where $n$ is an integer 0, 1, 2, 3, etc. indicative of the degree of polymerization. The average molecular weight of the epoxy condensate preferably is no greater than about 3000. This average molecular weight corresponds to an average value of $n$ of about 10 and includes species in which $n$ may range up to 20. Inasmuch as the described epoxy condensate contains two 1,2-oxirane oxygen atoms or epoxy groups per molecule, the 1,2,-epoxy equivalent weight is one half the average molecular weight. Thus the 1,2-epoxy equivalent weight of useful condensates preferably is no greater than 1500, i.e. the condensate on the average contains at least one 1,2-epoxy group per 1500 grams. Preferably the 1,2-epoxy equivalent of the condensate is from 190 to 1000.

While useful vic-epoxy condensates can include liquid species, those which are highly viscous or solid at room temperature are usually preferred for coating purposes. Such epoxy condensates are commercially available under the trademark "Epon" epoxy resin, "Epi-Rez" epoxy resin and "Araldite" ethoxyline resin. Epoxy condensates characterized by 1,2-epoxy equivalent weights respectively above and below the indicated limits can be appropriately blended to provide a mixture having an epoxy equivalent within the specified range. Other compounds containing 1,2-oxirane oxygen can advantageously supplement the resinous epoxy condensates described above. Examples of such compounds are unsaturated fatty acids epoxidized by known methods, epoxidized esters of unsaturated fatty acids with alcohols, and esters of epoxy condensates having the aforementioned general formula wherein one or more of the hydroxyls thereof are esterified with a fatty acid.

The relative proportions of the carboxyl-containing copolymer, the 1,2-epoxy condensate and supplemental, 1,2-oxirane oxygen compounds can be varied widely. For coating purposes, the molar ratio of

for the combination of organic film-forming materials can range satisfactorily from 0.25 to 10, preferably from 0.5 to 4. Ordinarily the weight proportion of 1,2-epoxy condensate is no greater than 100 parts, preferably no greater than 50 parts, per 100 parts of the carboxyl-containing copolymer. Where optimum color retention of white and light colored coatings is desired, the proportion of 1,2-epoxy condensates, particularly those derived from dihydric phenols, preferably is no greater than 30 parts. At least 5 parts of the 1,2-epoxy condensate per 100 parts of the acidic copolymer ordinarily is required to provide a practical crosslinking contribution to the combination of organic film-forming materials. The following are typical calculations of the

ratio in useful combinations of the carboxyl-containing copolymer and the compounds which supply 1,2-oxirane oxygen. 100 grams of carboxyl-containing copolymer having an acid number of 56 which provides 0.1 mol of carboxyl substituents are mixed with 30 grams of epoxy condensate having a 1,2-epoxy equivalent weight of 200 which provides 0.06 mol of 1,2-oxirane oxygen. The combination has a

ratio of 0.6. When this combination further includes 10 grams of an epoxidized fatty acid ester having a 1,2-oxirane oxygen content of 4%, i.e. an epoxy equivalent weight of 400, the total amount of the 1,2-oxirane oxygen is 0.085 mol and the

molar ratio is 0.85.

The volatile liquid portion of the composition includes at least one organic solvent for the copolymer and the epoxy condensate. Ordinarily this liquid portion is a mixture of solvents and non-solvent diluents in appropriate proportions which provide a desired balance in solids/viscosity relationship and balance in evaporation rate. The volatile solvent portion ordinarily includes aromatic hydrocarbon solvents such as toluol, xylol, benzol, or high solvency hydrocarbons having a substantial aromatic content. These solvents are ordinarily used in the preparation of the copolymer by solution polymerization techniques and they can be supplemented with alcohols, esters and ketones of the types ordinarily found in coating formulations. Aliphatic hydrocarbons can be included as suitable diluents to the extent that the film-forming organic materials remain compatible in solution in the solvent/diluent mixture. The boiling range of these volatile liquid components is not critical except that it is essential that they readily evaporate from the applied wet coating during the subsequent curing or baking step and leave a dry finish. Practical solvents and diluents ordinarily will have a boiling range within the temperature range of 80° C.–275° C. The volatile liquid portion is substantially free of water, but water may be present in a tolerant small amount as introduced with the various ingredients having a water content corresponding to ordinary commercial quality of dryness.

The total proportion of the volatile liquid components can range widely. In the case of unpigmented compositions, the volatile content can be as high as 95% by weight practically and with pigmented compositions at practical package viscosity can have as little as 10% by weight of the volatile liquid portion. Thus the non-volatile content can range from 5% to 90% by weight.

Pigments ordinarily used in the formulation of enamels, paints and lacquers can be included in the invention coating compositions in amounts ranging from 1 to 200 parts per 100 parts by weight of the organic film-forming material. Prime pigments are ordinarily used in proportions up to 100 parts. A higher proportion of the total pigment usually is composed of an appropriate mixture of prime pigment and extender pigment. Suitable pigments include metal oxides, hydroxides or hydrous oxides, chromates, silicates, sulfates, sulfides, and carbonates, carbon black, organic dyestuffs and lakes thereof, metal flakes and lamellar pigments such as mica. Because of the reactive carboxyl substituents of the addition polymer, use of strongly-basic, acid-sensitive and reactive pigments preferably avoided.

In addition to the various identified pertinent components, ancillary materials can be present in the final compositions. Examples of such materials are compatible organic solvent-soluble resins of which resinous polyesters, oil modified alkyd resins, phenol-formaldehyde resins, urea/formaldehyde/alkanol condensates, melamine/formaldehyde/alkanol condensates are representative; plasticizers, slip or anti-abrasion agents such as dispersible vegetable waxes, polyethylene wax, microcrystalline waxes, and perfluorocarbon waxes, metal driers, pigment dispersing agents, bodying and suspending agents, surface controlling agents such as the polymethylsiloxanes, and still other functional modifiers in ordinary amounts commonly found in coating formulations.

The quaternary ammonium salt latent curing agent, being a dry solid material, preferably is incorporated in the coating composition by treating it in the same manner as a pigment component and uniformly dispersing it in the composition by including the salt with the pigment in the pigment dispersion portion of the formulation. Any of the ordinary pigment dispersion techniques can be used provided operating temperatures do not exceed the decomposition temperature of the quaternary ammonium salt, preferably no higher than 200° F. The sand grinding technique of U.S. Patent 2,581,414 is particularly useful for dispersing the salt in the organic film-forming material either alone or in combination with pigment. Because of potential reactivity of the latent curing agent under temperature conditions which may develop during the dispersion process, it is preferable to avoid the presence of components containing the reactive 1,2-epoxy functionality in the dispersion portion of the composition. The carboxyl-containing polymer in solution, either alone or in combination with ancillary organic film-forming materials non-reactive with the quaternary ammonium salt, is preferably used as the dispersion vehicle. When a dispersible incompletely-soluble wax, such as vegetable wax, polyethylene wax, perfluorocarbon wax or microcrystalline hydrocarbon wax is to be dispersed in the coating composition, it is particularly advantageous to include the wax with the quaternary ammonium salt in the dispersion portion as the resulting wax coating on this quaternary ammonium latent curing agent further enhances the stability of the single package catalyzed composition at ordinary storage temperatures. When the quaternary ammonium salt is adequately soluble in a volatile liquid organic component of the composition, the salt in solution can be added at any stage of the preparation of the coating composition, although such solutions of catalyst are also preferably included in the dispersion portion.

The invention coating compositions containing the latent catalyst can be applied by spraying, brushing, dipping, roller coating, flow coating, or any of the methods ordinarily used in commercial coating operations, particularly in the finishing of appliances and vehicles, such as automobiles and trucks.

Curing of the coating applied to a heat-resistant substrate can be by any of the usual techniques of heating sufficiently to raise the temperature of the coating to 250°–450° F. Adequate cure usually is accomplished by baking for at least 10 minutes at 450° F. Usually 60 minutes is adequate at 250° F. Preferred heating conditions for optimum results are 15–20 minutes at 350° F. to 30–45 minutes at 275° F.

The following examples are illustrative of the principles and practice of the invention the scope of which however, is not limited to the specific details of these examples. Throughout the specification, the indicated parts and percentages are on a weight basis unless otherwise specifically designated.

*Example 1*

| Grind portion: | Parts by wt. |
|---|---|
| Titanium dioxide pigment | 257 |
| Terpolymer I solution—55% non-volatile | 89 |
| Catalyst A | 1.7 |
| Butanol | 94 |
| High solvency hydrocarbon—"Solvesso" 100 | 10 |
| Second Portion: | |
| Terpolymer I solution—55% non-volatile | 387 |
| Epoxy condensate "Epon" 828 | 28 |
| Wax dispersion 10% wax | 86 |
| Diacetone alcohol | 15.3 |
| Isopropanol anhydrous | 32 |
| | 1000 |

The Terpolymer I solution is the polymerization product of a ternary monomer mixture of styrene, ethyl acrylate and maleic anhydride, the latter component being partially esterified with 2-ethylhexanol. These monomers are in solution in a high solvency hydrocarbon solvent and the copolymerization is carried out at the reflux temperature of the monomer/hydrocarbon solution. The preparation is more specifically described as follows:

TERPOLYMER I SOLUTION

| First portion: | Parts by wt. |
|---|---|
| High solvency hydrocarbon "Solvesso" 100 | 152 |
| Industrial xylol | 50 |
| Second portion: | |
| Styrene | 248 |
| Ethyl acrylate | 165 |
| Maleic anhydride | 59 |
| Ditertiarybutyl peroxide | 5 |
| Third portion: 2-ethylhexanol | 157 |
| Fourth portion: Industrial xylol | 164 |
| | 1000 |

The first portion is heated to reflux temperature of about 308° F. The second portion is premixed, added to the first portion at a uniform rate over a period of 4 hours and then held at reflux temperature for 2 hours. The third portion is added and esterification carried out over a 2 hours period at reflux temperature. Then the heat is cut off, the fourth portion added and mixing is continued for ½ hour. This terpolymer solution has a non-volatile content of 55%, a viscosity of about $Z_4$ Gardner-Holdt at 25° C. and an acid number of about 61. The "Solvesso" 100 hydrocarbon solvent is characterized by a boiling range of 150°–190° C. and an aniline point of about −28° C.

The "Epon" 828 epoxy condensate is the product of condensing epichlorohydrin and diphenylol propane in alkaline solution. The condensation is characterized by an epoxy equivalent of about 200 and a melting point in the range of 8°–12° C.

The quaternary ammonium salt and the pigment in the grind portion are dispersed in the terpolymer vehicle by sand grinding at an output rate of 2.3 gallons per hour, the temperature during the grind being about 128° F. The second portion is added to the grind portion and mixed until the composition is uniform. The components of the second portion are added individually but they can be premixed and then added.

The wax dispersion is prepared by dissolving 10 parts of polyethylene wax in 30 parts of industrial xylol by heating the mixture at about 212° F. until clear, then diluting with 60 parts of butanol and milling the composition in a pebble mill for 72 hours to provide a uniform dispersion. Preparation and use of such polyethylene wax compositions in coating is described in U.S. Patent 2,518,462.

The Example 1 composition exhibits an initial viscosity of 26″ #3 Zahn cup at 25° F. and in the accelerated stability test at 120° F. gradually rose to 61″ in 4 weeks and remained ungelled at 8 weeks. At ordinary room temperature, the viscosity was unchanged at 2 months and reached 36″ at 6 months.

A comparative product A having the same composition as that of Example 1 except that Catalyst A is replaced with octadecyltrimethyl amonium acid phthalate in the same proportion of 0.6 part per 100 parts of the organic film-forming materials gelled in one week at 120 F. and gelled in two months at room temperature. This comparative curing agent, separately packaged and introduced into the uncatalyzed composition just before use provides excellent curing performance.

The Example 1 composition and the comparative product are appropriately thinned with a high solvency naphtha/butanol mixture to a spraying viscosity of about 30″ #2 Zahn cup at 25° C. applied to "Bonderized" steel panels to a dry film thickness of 1.5–1.8 mils, and cured by baking for 30 minutes at 300° F. The film properties of the respective cured coatings, which are representative appliance finishes are comparable in reference to hardness, degree of cure as measured by chemical resistance to various household materials which may come in contact with appliance finishes such as soap, detergents, grease, hot water, high humidity, etc.

Modified formulations of Example 1 are prepared at catalyst concentrations ranging from 0.3 to 0.9 part of the quaternary ammonium perchlorate salt per 100 parts of the organic film-forming material. These compositions exhibited the same degree of stability at room temperature and at 120° F. as the Example 1 composition containing 0.6 part of the salt catalyst.

*Examples 2 and 3*

These compositions are prepared to be identical with that of Example 1 except that Catalyst B and Catalyst C respectively are directly substituted for Catalyst A on an equal weight basis.

The stability of the resulting liquid coating compositions, cure of the applied coatings, film properties of the cured finishes and performance thereof as an appliance finish are equal to the characteristics of the Example 1 product.

*Example 4*

Grind portion: Parts by wt.
Titanium dioxide pigment_____ 257
Terpolymer I solution —55% polymer content _____ 89
Wax base —10% wax_____ 86
Catalyst D_____ 1.7
Butanol _____ 50
High solvency hydrocarbon "Solvesso" 100_ 10
Second portion:
Terpolymer I solution 55% polymer content_ 387
Epoxy condensate "Epon" 828_____ 28
Butanol _____ 44
Diacetone alcohol_____ 32
Isopropanol anyhdrous_____ 32

1000

The wax base is identical with that used in Example 1. Preparation of the composition is the same as in the preceding examples.

The initial viscosity of the composition is 26″ #3 Zahn cup at 25° C. and during 6 weeks storage at 120° F. the viscosity rose to 66″. At room temperature, the composition remained stable with the viscosity rising to only 33″ in 6 months. Corresponding compositions having a catalyst concentration of from 0.3 to 0.9 part of lauryltrimethylammonium hexafluorophosphate per 100 parts of the organic film-forming material exhibit equally good stability. The film properties of these several compositions having the indicated different catalyst levels applied and baked at 30′ at 325° F. are comparable with those of the comparative product described in Example 1. When the baking temperature is 30′ at 300° F. at catalyst concentration in the range of 0.30 to 0.45 part on the indicated basis develops a cure which is slightly inferior to that of the comparative product which is fully matched at the 0.6 part catalyst concentration.

*Example 5*

This composition is formulated identical with that of Example 4 except that Catalyst E is directly substituted for Catalyst D on an equal weight basis. The stability of this composition at room temperature and in the 120° F. oven, curing of the applied coating and performance of the cured coating are equivalent to that of Example 4.

*Example 6*

Grind portion: Parts by wt.
Titanium dioxide pigment_____ 267
Terpolymer I solution —55% polymer_____ 97
Catalyst F_____ 1
Butanol _____ 69
Hydrocarbon solvent —"Solvesso" 100____ 11
Second portion:
Terpolymer I solution —55% polymer_____ 388
Plasticizer "Paraplex RG-2_____ 33
Epoxy condensate "Epon" 828_____ 33
Isopropanol —anhydrous_____ 80
Butanol _____ 21

1000

"Paraplex" G-62 is an epoxidized unsaturated fatty acid ester plasticizer, the fatty acid component being present in the form of soya oil.

Example 6a is similarly prepared using 2 parts of Catalyst F in place of the indicated 1 part. Examples 6b, 6c and 6d are similarly prepared by substituting 1, 2 and 5 parts of respectively octadecyltrimethylammonium perchlorate for the indicated 1 part of Catalyst F. Comparative composition B is similarly prepared substituting 2 parts of octyldecyltrimethylammonium acid phthalate for the indicated 1 part of Catalyst F. Comparative composition C is similarly prepared by omitting Catalyst F from the composition.

The respective initial viscosities of these compositions and the viscosities after accelerated aging in a 120° F. oven are shown in the following table.

TABLE I.—VISCOSITY IN SECONDS USING #3 ZAHN CUP

|  | Initial | 120 hrs. | 192 hrs. | 9 days | 12 days | 16 days | 23 days |
|---|---|---|---|---|---|---|---|
| Example: |  |  |  |  |  |  |  |
| 6 | 34 | 37 | 38 | 46 | 70 | 89 | Gel |
| 6a | 34 | 41 | 47 | 64 | 188 | Gel | ----- |
| 6b | 34 | 35 | 36 | 40 | 52 | 55 | 74 |
| 6c | 34 | 36 | 38 | 43 | 55 | 60 | 85 |
| 6d | 34 | 40 | 44 | 49 | 68 | 72 | 101 |
| Comparative Compositions: |  |  |  |  |  |  |  |
| B | 33 | 55 | 389 | Gel | ----- | ----- | ----- |
| C | 34 | 36 | 36 | 39 | 47 | 53 | 59 |

The following Table II shows the gel time of the respective compositions under accelerated aging at 140° F. and 160° F.

TABLE II

|  | 140° F. Gel Time | 160° F. Gel Time |
|---|---|---|
| Example: |  |  |
| 6 | 192 hours | 120 hours. |
| 6a | 120 hours | 120 hours. |
| 6b | 16 days | 12 days. |
| 6c | 16 days | 9 days. |
| Comparative Composition: |  |  |
| B | 120 hours | 48 hours. |
| C | No gel | No gel. |

All the compositions, except Comparative Composition C which is catalyst-free, cure satisfactorily on application to "Bonderized" steel panel at ordinary coating thickness and baked for 30 minutes at 300° F. Comparative Composition C does not cure. The physical properties of the respective cured coatings 6, 6a, 6b, 6c and 6d are comparable with those of Comparative B Composition.

*Examples 7, 8 and 9*

The composition of Example 4 is duplicated except that Catalyst G, Catalyst H and lauryltrimethyl ammonium molybdate respectively are substituted for Catalyst D on an equal weight basis in Example 4 and at catalyst levels ranging from 0.30 to 0.90 part per 100 parts of the organic film-forming material. At concentrations of 0.6 to 0.9 part of these curing agents which provide adequate cure at a baking temperature of 30' at 300° F., the package stability is good with the viscosity rising to 84"–128" in 3 weeks and to 156"–180" in 4 weeks at 120° F. from an original viscosity of 27" #3 Zahn cup at 25° C. These quaternary ammonium molybdate and tungstate salts are slightly less effective curing agents than the quaternary ammonium perchlorates, hexafluorophosphates and fluoroborate salts although the cure is adequate at practical catalyst concentrations and practical baking temperatures.

*Example 10*

| Grind portion: | Parts by wt. |
|---|---|
| Titanium dioxide pigment | 274 |
| Terpolymer I solution—55% polymer | 95 |
| Butanol | 101 |
| High solvency hydrocarbon "Solvesso" 100 | 11 |
| Second portion: | |
| Terpolymer I solution—55% polymer | 343 |
| Epoxy condensate solution—50% resin | 122 |
| Isopropanol—anhydrous | 36 |
| Wax base—32% non-volatile | 18 |
| | 1000 |

The epoxy condensate solution consists of 50% epoxy resin "Epon" 1001 in a mixture of equal parts by weight of xylol and anhydrous isopropanol. "Epon" 1001 is characterized by an epoxy equivalent of 450 to 525 and has a melting point of about 70° C.

The wax base is the product of pebble grinding a mixture of 15 parts of polymerized microcrystalline wax, 30.8 parts of the Terpolymer I solution and 54.2 parts of butanol for about 25,000 cycles with the mill temperature not exceeding 120° F. The wax is "Polymekon," supplied by Warwick Wax Co., Inc. having a softening point of 195–200° F. and ASTM–D–5–32 penetration of 2–3.

Aliquot portions of this uncatalyzed Example 10 composition are mixed respectively with curing catalyst as follows, the catalyst being introduced as a 10% solution in diacetone alcohol.

10a. 0.15 part of Catalyst A per 100 parts of organic film-forming material.
10b. 0.30 part of Catalyst A on same basis.
10c. 0.60 part of Catalyst A on same basis.
10d. 0.90 part of Catalyst A on same basis.
Comparative Composition D is prepared by adding 0.15 part of octadecyltrimethylammonium acid phthalate per 100 parts of the organic film-forming material. This comparative catalyst is added in the form of a 20% solution in xylol.

In the 120° F. accelerated stability test, samples 10a through 10d exhibited the following viscosity changes:

| | Viscosity, #3 Zahn, at 25° C. |
|---|---|
| Original viscosities | 31"–28" |
| 1 week at 120° F | 40"–45" |
| 2 weeks at 120° F | 52"–54" |
| 3 weeks at 120° F | 70"–78" |
| 4 weeks at 120° F | 102"–160" |

The comparative Composition D increased from 30" original viscosity to 60" in one week, to 162" in 2 weeks, and gelled during the third week.

The film properties of these respective compositions applied to "Bonderized" steel at about 1.5 mils dry thickness and baked for 30' at 320° F. are comparable.

*Example 11*

| Grind portion: | Parts by wt. |
|---|---|
| Titanium dioxide pigment | 250 |
| Catalyst A | 2 |
| High solvency hydrocarbon "Solvesso" 100 | 40 |
| Xylol | 42 |
| Diacetone alcohol | 7 |
| Interpolymer II solution 55% polymer | 90 |
| Second portion: | |
| Interpolymer II solution 55% polymer | 255 |
| Castor oil | 38 |
| Epoxy condensate "Epon" 828 | 38 |
| Epoxy varnish ester 60% resin | 64 |
| Melamine/formaldehyde/butanol condensate— 50% resin in 5:1 butanol:xylol | 152 |
| Butanol | 12 |
| Diacetone alcohol | 10 |
| | 1000 |

Proportions of components in the organic film-forming material:

| | |
|---|---|
| Interpolymer II | 50 |
| Castor oil | 10 |
| Epoxy condensate | 10 |
| Epoxy varnish | 10 |
| Melamine condensate | 20 |

Catalyst A concentration: about 0.5 part per 100 parts of organic film-forming material.

The grind portion is prepared by the sand grinding technique described above and the ingredients of the second portion are added to the grind portion and the composite mixed until uniform.

Interpolymer II is the solution polymerization product of the following composition:

| | Parts by wt. |
|---|---|
| First portion: High solvency hydrocarbon "Solvesso" 100 | 430 |
| Second portion: | |
| Styrene | 700 |
| Methacrylic acid | 100 |
| Ethyl acrylate | 200 |
| Tertiarybutyl peroxide | 10 |
| Third portion: | |
| Industrial xylol | 230 |
| Butanol | 150 |
| | 1820 |

The first portion is heated to reflux temperature of 156°–160° C. The second portion, premixed, is slowly added to the first portion over a period of 3–4 hours with the polymerization temperature maintained at 148°–150° C., thereafter held at this temperature for 90 minutes, then cooled below the initial boiling temperature of the third portion solvents, and then diluted by addition of the third portion. The resulting interpolymer solution has a polymer content of about 55% by weight and a Gardner-Holdt viscosity of about Z–1 at 25° C. The interpolymer per se has a relative viscosity of 1.089 determined at 0.500 gram concentration in 50 ml. of ethylene dichloride using a Cannon-Fenske (modified Ostwald) viscosimeter size No. 100. The epoxy varnish is the product of varnish cooking 302 parts of epoxyhydroxypolyether resin ("Epon" 1004 epoxy equivalent 905–985) and 203 parts of soya oil acids at 500° F. with a mild $CO_2$ gas blow to an acid number of about 5 and a viscosity of $Z_3$–$Z_4$ at 60% concentration and then thinning this concentration with about 328 parts high solvency hydrocarbon ("Solvesso" 100).

This coating composition is package-stable at room temperature, being free of gelation or significant bodying during six months' storage. In the 120° F. accelerated stability test, the composition exhibits a moderate advance in viscosity, up to about 50%, in 4 weeks and no gelation in 6 weeks. A Comparative Composition E of equivalent formulation containing 0.5 part of octadecyltrimethylammonium acid phthalate as the catalyst gelled in 1–2 weeks at 120° F. and gelled in two months at room temperature.

This Example 11 composition is useful as a topcoat for automobile bodies. The composition thinned for spray application, applied to primed autobody steel at the usual topcoat thickness is cured adequately by baking for 30 minutes at 275° F. The film properties and degree of cure of the resulting finish are comparable with those of the comparative product cured under equal conditions.

*Examples 12, 13 and 14.—Clear Resin Solution*

|  | Parts by wt. |
|---|---|
| Terpolymer I solution 55% polymer | 790 |
| Epoxy condensate "Epon" 828 | 65 |
| Toluol | 145 |
|  | 1000 |

Example 12, 13 and 14 compositions are prepared by respectively adding 0.2 part of Catalysts J, K, and L to 100 parts by weight portions of the above clear resin solution and mixing the compositions thoroughly to uniformly distribute the catalysts therein. Samples of the respective compositions are placed in a 120° F. oven for accelerated aging. These oven-aged samples were fluid when examined at six days and were not significantly advanced in viscosity over corresponding samples retained at room temperature. The oven-aged samples did not gel in two weeks at 120° F. A Comparative Composition F containing 100 parts of the clear resin solution and 0.27 part of "Arquad" 2HT–75 solution of quaternarydialkyldimethyl ammonium chloride gelled in less than six days at 120° F. Thin films of these respective compositions and Comparative Composition F are adequately cured when baked for 30 minutes at 300° F.

The foregoing examples are for the purpose of clearly illustrating the invention and no unnecessary limitations of the invention are to be inferred therefrom. The invention is not intended to be limited except as defined in the appended claims.

I claim:

1. A liquid coating composition comprising, as the essential organic film-forming components, a compatible mixture of an acidic copolymer (I) of a plurality of polymerizable alpha,beta monoethylenically-unsaturated monomers, at least ternary in composition, consisting essentially of (a) an alpha-beta monoethylenically-unsaturated alkenyl-substituted aryl hydrocarbon, (b) at least one $C_1$ to $C_{12}$ alkanol ester of an alpha,beta monoethylenically-unsaturated monocarboxylic acid, and (c) a copolymerizable alpha,beta monoethylenically-unsaturated carboxylic acid monomer having from one to two —COOH moieties per molecule in a proportion sufficient to provide said acidic copolymer (I) with a carboxylic acid number in the range of 10 to 150, and a resinous vic-epoxy condensate (II) having an average of more than one

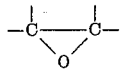

1,2-oxirane moiety per molecule and a 1,2-oxirane equivalent weight up to about 1500, reactive functional groups in said vic-epoxy condensate (II) being limited to said 1,2-oxirane moieties and hydroxyl moieties, the relative proportions of said acidic copolymer (I) and said vic-epoxy condensate (II) being such that the molar ratio of

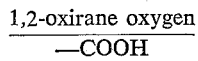

is in the range of 0.25 to 10, said film-forming components being compatibly in solution in a volatile liquid comprising an organic solvent therefor, and, as a latent curing agent for said film-forming components, (III) at least one substantially water-insoluble quaternary ammonium salt in a proportion in the range of 0.05 to 5 parts per 100 parts total weight of organic film-forming components in said composition, said quaternary ammonium salt having the general formula

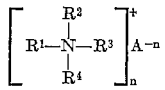

wherein $R^1$—, $R^2$—, $R^3$, and $R^4$— of the indicated monovalent quaternary ammonium cation are monovalent $C_1$ to $C_{20}$ hydrocarbon radicals, two to four of said hydrocarbon radicals being $C_1$ to $C_4$ alkyl radicals, the total number of carbon atoms in said cation being from 4 to 48, the inorganic anion $A^{-n}$ is composed of at least five atoms including at least one atom of an electropositive chemical element having joined covalently thereto a plurality of at least four atoms of at least one electronegative chemical element selected from the group consisting of oxygen and fluorine, the plurality of said electronegative atoms being sufficient to provide said inorganic anion with electronegative valence of $-n$, where $n$ is an integer having a value of from 1 to 4.

2. A liquid coating composition of claim 1 wherein said quaternary ammonium cation of said latent curing agent (III) is characterized by the presence of two to three said $C_1$ to $C_4$ alkyl radicals and one to two acyclic aliphatic hydrocarbon radicals each having from more than four up to 20 carbon atoms joined to the nitrogen atom.

3. A liquid coating composition of claim 2 wherein said quaternary ammonium cation of said latent curing agent (III) is characterized by the presence of two to three $CH_3$— radicals and one to two $C_8$ to $C_{20}$ acyclic aliphatic hydrocarbon radicals joined to the nitrogen atom.

4. A liquid coating composition of claim 1 wherein said latent quaternary ammonium salt curing agent (III) is characterized by said inorganic anion being composed of at least one electropositive chemical element having joined thereto a plurality of at least four electronegative oxygen atoms sufficient to provide the anion with an electronegative valence in the range of $-1$ to $-4$.

5. A liquid coating composition of claim 4 wherein said inorganic anion of said latent curing agent (III) is perchlorate ion, —$ClO_4^-$.

6. A liquid coating composition of claim 1 wherein said latent quaternary ammonium salt curing agent (III) is characterized by said inorganic anion being composed of at least one electropositive chemical element having joined thereto a plurality of at least four electronegative fluorine atoms, said plurality of electronegative fluorine atoms being sufficient to provide said inorganic anion with electronegative valence in the range of $-1$ to $-2$.

7. A liquid coating composition of claim 6 wherein said inorganic anion of said latent curing agent (III) is hexafluorophosphate ion, —$PF_6^-$.

8. A liquid coating composition of claim 1 wherein said vic-epoxy condensate (II) is present in the proportion of 5 to 100 parts per 100 parts by weight of said acidic copolymer (I).

9. A liquid coating composition of claim 1 which further includes pigment in proportions ranging from 1 part to 200 parts per 100 parts total weight of organic film-forming components.

10. A liquid coating composition of claim 1 wherein said acidic copolymer (I) is the polymerization product of a mixture of said copolymerizable monomers consisting essentially of (a) styrene, (b) at least one $C_1$ to $C_{12}$ alkanol ester of an alpha,beta monoethylenically-unsaturated monocarboxylic acid, and (c) and said alpha,beta monoethylenically-unsaturated carboxylic acid monomer having one to two —COOH moieties per molecule.

11. A liquid coating composition of claim 10 wherein said ester monomer (b) is a $C_1$ to $C_{12}$ alkanol ester of an alpha,beta monoethylenically-unsaturated monocarboxylic acid having a terminal alpha methylene group, and said alpha,beta monoethylenically-unsaturated carboxylic acid monomer (c) is characterized as having a terminal alpha methylene group.

12. A liquid coating composition of claim 11 wherein said acidic copolymer (I) is the polymerization product of said monomer mixture consisting essentially of (a) styrene, (b) at least one $C_1$ to $C_{12}$ alkanol ester of acrylic acid, and (c) methacrylic acid.

13. A liquid coating composition of claim 10 wherein said acidic copolymer (I) is the polymerization product of said monomer mixture consisting essentially of (a) styrene, (b) at least one $C_1$ to $C_{12}$ alkanol ester of acrylic acid, and, as said carboxylic acid monomer, (c) a partial ester of an alpha ethylenically-unsaturated alpha,beta dicarboxylic acid and a saturated aliphatic monohydric alcohol.

14. A liquid coating composition of claim 13 wherein said acidic copolymer (I) is the polymeriaztion product of a monomer mixture consisting essentially of (a) styrene, (b) a $C_1$ to $C_4$ alkanol ester of acrylic acid, and (c) a partial ester of maleic acid with a $C_1$ to $C_{12}$ saturated aliphatic monohydric alcohol.

15. A liquid coating composition of claim 1 wherein said resinous vic-epoxy condensate is an epoxy polyether product of condensing epichlorohydrin and diphenylolpropane, said vic-epoxy condensate having an average of more than one and up to about two 1,2-oxirane moieties per molecule and being characterized by a 1,2-oxirane equivalent weight in the range of from about 190 to about 1000.

16. A stable liquid coating composition comprising as the essential organic film-forming components, a compatible mixture of an acidic copolymer (I) of a mixture of alpha-beta monoethylenically-unsaturated monomers consisting essentially of (a) styrene, (b) at least one $C_1$ to $C_{12}$ alkanol ester of acrylic acid, and (c) a copolymerizable alpha,beta monoethylenically-unsaturated carboxylic acid monomer having from one to two —COOH moieties per molecule and being in a proportion sufficient to provide said acidic copolymer with an acid number in the range of 20 to 100, and a resinous vic-epoxy condensate of epichlorohydrin and diphenylolpropane having an average of more than one and up to about two

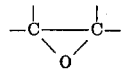

1,2-oxirane moieties per molecule and a 1,2-oxirane equivalent weight up to about 1000 in the proportions of 5 to 50 parts of said vic-epoxy condensate (II) per 100 parts by weight of said acidic copolymer (I), a volatile liquid organic solvent for said organic film-forming components in a proportion sufficient to form a liquid solution thereof, pigment in the proportions of 1 to 200 parts, and, as a latent curing agent, 0.1 to 2 parts of a substantially water-insoluble quaternary ammonium perchlorate salt having the general formula:

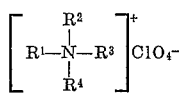

where $R^1$—, $R^2$—, $R^3$—, and $R^4$— are each monovalent hydrocarbon radicals of which two to four of said hydrocarbon radicals are $C_1$ to $C_4$ alkyl and the remaining said hydrocarbon radicals up to two are $C_8$ to $C_{20}$ acyclic hydrocarbon radicals, said parts of pigment and latent curing agent being based per 100 parts total weight of organic film-forming materials present in the composition.

17. A method of preparing a package-stable catalyzed liquid coating composition comprising, as the essential organic film-forming materials, a compatible mixture of an acidic copolymer (I) and a resinous vic-epoxy condensate (II) having a plurality of

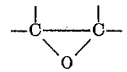

1,2-oxirane moieties per molecule and a 1,2-oxirane equivalent weight up to 1500, said film-forming components being in solution in a volatile liquid comprising an organic solvent therefor, and a quaternary ammonium inorganic anion salt (III) substantially insoluble in water at ordinary room temperature, as a latent curing agent, comprising the steps of dispersing said latent curing agent salt (III) as a particulate solid in a liquid grinding medium comprising a solution of at least one of said organic film-forming materials (I) and (II) in a volatile liquid organic solvent therefor, said dispersion step being carried out at a temperature below the decomposition temperature of said quaternary ammonium salt latent curing agent (III), and blending the remaining components of the liquid coating composition with the resulting dispersion portion, said latent curing agent (III) being present at a proportion in the range of 0.05 to 5 parts per 100 parts total weight of organic film-forming material in the liquid coating composition and being characterized as having a solubility in water no greater than 3% at 25° C., and further characterized by the general formula:

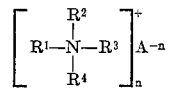

wherein $R^1$—, $R^2$—, $R^3$—, and $R^4$— of the indicated monovalent quaternary ammonium cation are monovalent $C_1$ to $C_{20}$ hydrocarbon radicals of which two to four of said hydrocarbon radicals are $C_1$ to $C_4$ alkyl, the total number of carbon atoms in said cation being from 4 to 48, the inorganic anion $A^{-n}$ is composed of at least five atoms including at least one atom of a chemical element in electropositive state covalently joined to a plurality of at least four atoms of at least one chemical element in electronegative state selected from the group consisting of oxygen and fluorine, said plurality of electronegative atoms being sufficient to provide said inorganic anion with electronegative valence of $-n$ where $n$ is an integer having a value in the range of 1 to 4, said acidic copolymer (I) being a copolymer of a plurality of alpha,beta monoethylenically-unsaturated monomers, at least ternary in composition, consisting essentially of (a) an alpha,beta monoethylenically-unsaturated alkenyl-substituted aryl hydrocarbon, (b) at least one $C_1$ to $C_{12}$ alkanol ester of an alpha-beta monoethylenically-unsaturated monocarboxylic acid, and (c) a copolymerizable alpha,beta monoethylenically-unsaturated carboxylic acid monomer having from one to two —COOH moieties per molecule in a proportion sufficient to provide said acidic copolymer (I) with an acid number in the range of 10 to 150, and said vic-epoxy condensate (II) being further characterized as having reactive functional groups therein limited to said 1,2-oxirane moieties and hydroxyl moieties, the relative proportion of said acidic copolymer (I) and said vic-epoxy condensate (II) being such that the molar ratio for

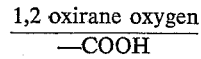

is in the range of 0.25 to 10.

18. The method of claim 17 wherein said step of dispersing said latent curing agent salt (III) includes concurrently dispersing pigment with said delayed-acting insoluble quaternary ammonium inorganic anion salt (III).

19. The method of claim 18 wherein said step of dispersing said latent curing agent (III) further includes concurrently dispersing with said delayed-acting quaternary ammonium inorganic anion salt (III) and pigment, a small minor proportion of at least one dispersible wax selected from the group consisting of vegetable waxes, microcrystalline hydrocarbon waxes, polymers of ethylene and perfluorocarbon waxes, said dispersion step being carried out at a temperature no greater than 200° F.

References Cited in the file of this patent

UNITED STATES PATENTS

| | | |
|---|---|---|
| 2,662,870 | Allenby | Dec. 15, 1953 |
| 2,934,516 | Hicks | Apr. 26, 1960 |